Feb. 22, 1966     J. E. POTTHARST, JR     3,236,748
PROCESS FOR DISTILLING SEA WATER
Original Filed April 21, 1960     2 Sheets-Sheet 1

INVENTOR.
JOHN E. POTTHARST, JR.
BY
his ATTORNEYS.

INVENTOR.
JOHN E. POTTHARST, JR.

United States Patent Office
3,236,748
Patented Feb. 22, 1966

3,236,748
PROCESS FOR DISTILLING SEA WATER
John E. Pottharst, Jr., 861 Carondelet St.,
New Orleans, La.
Continuation of application Ser. No. 23,751, Apr. 21,
1960. This application May 21, 1964, Ser. No. 377,160
13 Claims. (Cl. 203—11)

This invention relates to a process for distilling sea water which eliminates the formation of scale on the heat exchange surfaces of the distillation apparatus.

This is a continuation of the copending application of John E. Pottharst, Jr., Serial No. 23,751, filed April 21, 1960, which is a continuation-in-part of Serial No. 726,362, filed April 4, 1958.

In recent years, particularly in view of the increased range of naval vessels, the increased activity in tideland oil drilling and the general interest in producing potable water from sea water, there has arisen a great demand for a more efficient method and apparatus for distilling sea water, with particular emphasis on eliminating the crystallization and scaling of the metal heat exchange surfaces with which the sea water comes in contact. It is no exaggeration to say that this is one of the most pressing needs of these times. Many proposals have been advanced to minimize crystallization and scaling of sea water, and some of these proposals have helped in the control thereof. The fact remains, however, that even today with all of the efforts that have been made to minimize scaling, it is still necessary to shut down sea water distillation units at intervals of approximately every two weeks or so in order to subject the equipment to an acid treatment for the purpose of removing scale and other debris which forms on and adheres to the heat exchange surfaces, thereby greatly reducing the efficiency of distilling sea water.

The principal object of the present invention is to provide a practical and efficient process for distilling sea water which eliminates the tendency of the sea water to form scale on the heat exchange surfaces.

These objects have been achieved by the discovery of certain critical factors which determine the tendency and rate of formation of scale on the heat exchange surfaces. The present invention, therefore, contemplates careful control over certain of the operating conditions under which the vaporization of sea water is carried out, namely, control of the temperature of the heat exchange surface against which the liquid to be vaporized comes into contact, control of the pressure at which the vaporization of the sea water is carried out, control of the concentration of the sea water to be distilled, particularly by regulation of the relationship between the rate at which the concentrated sea water is discharged as blowdown to the rate at which feed water is supplied, and control of the velocity of the sea water to be distilled relative to the heat exchange surface with which it comes into contact.

For a complete understanding of the present invention, reference may be made to the detailed description which follows, and to the accompanying drawings, in which.

Figures 1, 2:
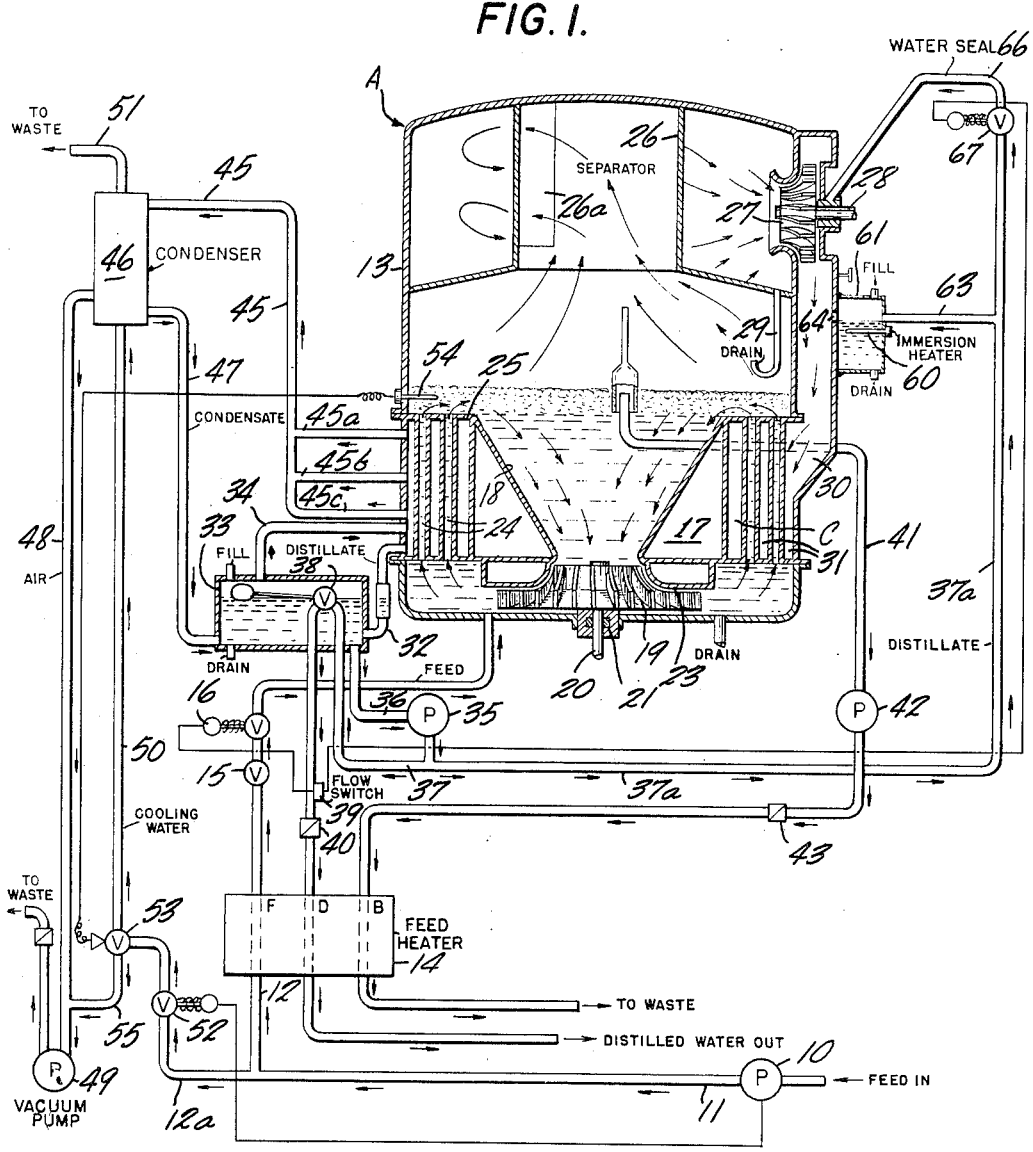
FIGURE 1 is a schematic cross-sectional view of a distillation unit suitable for carrying out the present invention.
FIGURE 2 is a greatly enlarged view of a heat exchange surface which forms part of the apparatus shown in FIGURE 1.

To facilitate an understanding of the present process, the apparatus shown in FIGURE 1 of the drawings will be briefly described. The apparatus shown in FIGURE 1 is the subject matter of the copending application of John E. Pottharst, Jr., Serial No. 7,374, filed February 8, 1960.

Referring to FIGURE 1, the sea water to be distilled is supplied by a pump 10 through conduits 11 and 12 to a housing 13 of the distillation unit, generally designated A. Before being admitted to the distillation unit, the sea water is brought into out-of-contact heat-exchange relationship with both the distillate manufactured by the unit A and the undistilled concentrated liquid or blowdown discharged as waste therefrom. The housing 13 contains a vaporization chamber having a lower liquid region and an upper vapor region. Before being admitted into the vaporization chamber, the sea water passes through a manually operated valve 15 and an automatically operated valve 16.

The lower liquid region of the vaporization chamber includes a liquid reservoir which is defined by a funnel-shaped wall 18 surrounded by a void 17. The lower end of the funnel-shaped wall 18 communicates with the center of a blade-carrying rotor or circulator 19 which is mounted at the bottom of the vaporization chamber for rotation about a vertical axis. The rotor is driven by suitable drive means (not shown) through a shaft 20 which extends through a seal 21 accommodated in the bottom wall of the housing 13.

The rotor 19 operates to maintain a continuous circulation of the sea water in a toroidal pattern of flow within the vaporization chamber. More specifically, the lower end of the funnel-shaped wall 18 forms an axial intake for the circulator 19 so that a downward flow of the liquid is maintained within the reservoir. An annular wall 23 spaced above the bottom wall of the housing 13 cooperates with the said bottom wall to form a radial discharge passage for the liquid circulated by the rotor. The wall 23 is generally parallel with the bottom wall of the housing at its outer periphery, but curves upwardly toward the intake opening at its inner periphery.

The circulator moves the liquid downwardly through the central reservoir, then outwardly to the outer periphery of the lower region of the housing 13, and then upwardly through the tubular passages 24 which are arranged in annular array around the outside of the funnel-shaped wall 18. As the sea water flows upwardly through the vertical tubes 24, it is brought into out-of-contact heat-exchange relationship with a fluid at higher temperature, thereby raising the temperature of the sea water above the boiling point established by the pressure within the upper vapor region of the vaporization chamber. The velocity is maintained high enough to prevent the vapor from being evolved within the vertical heat exchange tubes. As soon as the liquid emerges from the upper ends of the heat exchange tubes, a substantial amount of the liquid flashes into vapor. The unvaporized sea water flows across the upper heat exchange surface 25 and returns to the upper end of the central reservoir to complete the cycle of flow described above.

The vapor evolved from the liquid flows upwardly and thence outwardly through a moisture-separating wall 26 accommodated within the upper vapor region of the vaporization chamber. This flow of vapor is facilitated by a compressor-blower 27 accommodated within the housing 13, but outside the separator wall 26. The compressor-blower is driven by an electric motor (not shown) located outside of the housing 13 through a shaft 28.

The separator wall 26 may take various forms, such as a perforated wall having baffles 26a interposed in the passages thereof. Moisture formed on the inside surface of the wall 26 falls back into the lower liquid region of the vaporization chamber. Moisture formed on the outside surface of the separator wall flows downwardly and then outwardly along the sloped surface of the base of the wall 26 and returns to the vaporization chamber through a drain pipe 29.

The compressed vapor flows downwardly through a duct 30 to a vapor chest 31 which accommodates the heat exchange tubes 24. The compressed vapor is condensed while in out-of-contact heat-exchange relationship with the sea water within the tubes 24, thereby transferring its latent heat to the liquid to be distilled. The higher the compression of the vapor, the greater is the amount of heat transferred to the liquid to be distilled. It is possible to carry on the distillation operation once the operation is initiated by only the energy expended in driving the compressor-blower 27.

The distillate is withdrawn from the vapor chest 31 through a discharge conduit 32 and conducted thereby to a tank 33. The tank 33 holds a quantity of distillate which is useful particularly during starting of the apparatus. Vapor evolved in the tank 33 during operation flows back into the vapor chest through the conduit 34.

The distillate accumulated within the tank 33 is withdrawn therefrom by a pump 35 through a conduit 36, a branch conduit 37, a float-controlled valve 38 within the tank 33, a flow switch 39, a one-way valve 40 and the feed heater 14 before being conducted to a storage tank. The remainder of the distillate discharged by the pump 35 flows through a conduit 37a as will be described below in more detail. The float-controlled valve 38 operates to maintain a certain level of distillate within the tank 33. As the level of the liquid falls below that level, the float-controlled valve closes, decreasing or stopping entirely the flow through the conduit 37. When the level of the liquid within the tank is high enough, the float-controlled valve opens.

The concentrated liquid is drawn off from the bottom of the vaporization chamber through a conduit 41 by a blowdown pump 42 and then through a one-way valve 43 and the sea water preheater 14 wherein it is brought into heat-exchange relationship with the sea water introduced into the vaporization chamber.

A vent conduit 45 having inlets 45a, 45b and 45c at different levels is provided to remove the air and any other non-condensible gases from the vapor chest 31. This air mixed with steam is 100% saturated. Consequently, a certain amount of steam is removed with the air. However, the steam is in large part recovered within the condenser 46 and returned to the tank 33 via a conduit 47.

The non-condensible gases are removed from the condenser 46 through a conduit 48 by a water-cooled vacuum pump 49. The cooling water for the condenser is supplied from the intake conduit 11 through conduits 12a and 50. This coolant is discharged as waste of the condenser via a conduit 51. The supply of coolant to the condenser is controlled by a solenoid-actuated on-off valve 52, interposed in the conduit 12a and an automatic solenoid-actuated valve 53 controlled by a thermostat 54 within the vaporization chamber. The valve 52 is opened as soon as the motor which drives the pump 10 is started. The valve 53 controls the flow of coolant to the condenser 46 through the conduit 50 and the flow of coolant to the pump 49 through the conduit 55 in a manner to be described.

The auxiliary heat required by the system while it is in operation or for starting is supplied by electric immersion heaters 60 accommodated within a tank 61 adjacent the duct 30. Distillate is supplied to the tank 61 by the pump 35 through the conduits 37a and 63. The vapor evolved within the tank 61 by the heat supplied by the immersion heaters is introduced into the duct 30 through a connecting port 64. The heaters are automatically controlled by the thermostat 54 so that they will supply the necessary heat for initiating the operation of the apparatus or during the operation of the apparatus as additional heat is required.

Sealing water for the shaft 28 is supplied to the intake of the compressor-blower 27 through a conduit 66 which communicates with the discharge side of the distillate pump through the conduit 37a. A solenoid-controlled valve 67 interposed in the conduit 66 is opened under the control of the flow switch 39 when the apparatus is functioning to manufacture distillate in a sufficient quantity.

In starting up the apparatus, the reservoir 18 is filled and the manually controlled valve 15 in the conduit 12 is opened. However, the automatically controlled valve 16 is closed preventing the supply of sea water to the reservoir. Also, the valve 67 in the conduit 66 is closed during the starting period. The immersion heaters 60 heat the liquid within the tank 61, supplying vapor to the vapor chest 31. As the vapor is condensed within the vapor chest, it gives up heat to the liquid within the tubes 24 to evolve vapor from the liquid within the liquid region of the vaporization chamber. This vapor rises through the vaporization chamber, is compressed by the compressor-blower 27 and is introduced into the vapor chest 31 through the duct 30. The liquid within the tank 61 is replenished from the tank 33 during this initial operation. This, in turn, reduces the level of liquid within the tank 33 so that the valve 38 close the conduct 37, causing the pump 35 to feed the water through the conduit 37a to the tank 61. As the manufacture of distillate increases and the level of the liquid within the tank 33 rises, the float-controlled valve 38 will open, permitting distillation to flow through the conduit 37. When this flow increases to about one-third of the unit's rated capacity, the flow switch 39 is actuated, opening the solenoid-controlled valves 16 and 67, the former admitting additional sea water to the vaporization chamber and the latter supplying sealing water to the shaft 28.

When equilibrium is established and the apparatus is operated at rated capacity, the present process requires that a relatively low pressure be maintained within the vapor region of the vaporization chamber, thereby establishing a low boiling point within the range of from 95° F. to 120° F. With proper control of the pressure within the vaporization chamber, of the velocity of the continuously circulated sea water within the vaporization chamber and of the concentration of the sea water, scaling within the tubes 24 can be eliminated or virtually so when distilling sea water.

The rotary circulator 19, as explained above, maintains a continuous toroidal circulation pattern within the liquid region of the vaporization chamber. This circulation pattern affords a relatively short hydraulic circuit and keeps at a minimum the expenditure of horsepower to maintain the continuous flow. Furthermore, part of the hydraulic circuit itself, that is, the bottom wall of the housing 13 and the spaced-apart wall 23 serve as the housing for the circulator, thereby simplifying the design of the evaporator and effecting savings both in space and material.

In flowing from the liquid reservoir to the heat exchange tubes and back to the liquid reservoir, the liquid travels in a closed path, that is to say, through a full 360 degree circuit. Since the pumping friction for non-linear flow is greater than for linear flow and the dissipation of energy increases with the total number of degrees through which the liquid must turn, the design of the rotary circulator 19 and the flow path is especially important. More specifically, the circulator itself imparts a 90° or one-quarter turn to the liquid while at the same time providing the shortest possible flow path for the liquid. In addition, in making the bottom of the vaporization chamber a modified centrifugal pump volute, the total length of the hydraulic path is held to a minimum, thereby contributing to the efficiency of the circulatory system, an advantage over and above the compactness, low cost and simplicity which are inherent in the design.

To maintain a constant temperature and pressure within the vaporization chamber, it is necessary to compensate for variations in the temperature of the sea water introduced into the vaporization chamber. When colder sea water is introduced, it is necessary to supply auxiliary heat by the immersion heaters 60 which operate under the control of the thermostat 54. When warmer sea water is introduced, there is a problem of disposing of excess heat even though the immersion heaters are inoperative. This disposal of the heat in the system under consideration is accomplished by increasing the rate of withdrawal of vapor from the vapor chest 31 through the conduit 45, by increasing the quantity of coolant supplied to the vacuum pump 49 or by increasing the flow of coolant through the vent condenser. As will be described below, in this system, it is accomplished by increasing the flow of coolant through the vacuum pump until it is at maximum and then by increasing the flow of coolant to the vent condenser.

Essentially, the purpose of the vacuum pump 49 is to remove air and non-condensible gases, and for this purpose any suitable pump can be used. The vacuum pump is preferably a water cooled ring type which is cooled by sea water supplied to the pump via the conduit 55. A characteristic of this type of pump is that at a constant low pressure below atmospheric pressure, it has a high air-handling capacity at low cooling water temperatures; conversely, with increasing coolant temperatures the air-handling capacity of the pump decreases to a point in which its operation at the constant low pressure becomes somewhat erratic. This is the result of the temperature of the coolant approaching or reaching the boiling point established by the low pressure. When the coolant reaches the temperature of vaporization (that is, at the low established pressure) the pump 49 can no longer pump air, inasmuch as steam fills the pumping spaces. Therefore, the vent condenser 46 is used to protect the vacuum pump from excess steam reaching it after the pump was already supplied with a maximum supply of coolant. The condensate manufactured in the vent condenser, of course, is salvaged and as explained above, delivered to the tank 33.

The withdrawal of increased vapor from the vapor chest 31 to remove excess heat in the manner described above has the advantage of providing a high rate of flow therethrough, thereby affording the best possible flushing out of air and non-condensible gases. This not only helps maintain constant temperature and pressure within the vaporization chamber, but contributes to the efficiency of the apparatus.

Control of the high vacuum (low pressure) vapor compression distillation system of the present invention is achieved by the regulation of the coolant supplied to the vacuum pump 49 and the coolant supplied to the vent condenser 46 by the control valve 53. At low sea water temperatures, the water educted from the vapor chest 31 is held at a minimum required by reducing or cutting off the flow of coolant to the vent condenser via the conduit 50 and by throttling the flow of coolant to the vacuum pump 49 only to the minimum necessary to provide the necessary water seal for the pump. At higher feed water temperatures, in order to maintain constant evaporating temperature and pressure, it is necessary to dissipate some of the usable heat. Initially this is accomplished by increasing the flow of the coolant to the pump 49 under the control of the temperature-responsive valve 53. However, this can be increased only until the maximum water allowable through the pump is reached, i.e., a point is reached at which further increase of coolant to the pump 49 results in reduced pump capacity and in increased horsepower consumption. The control valve 53 also limits the flow to the pump 49 to the maximum allowable. At still higher feed water temperatures, there is no further increase in the supply of coolant to the pump (i.e., once the maximum rate of flow has been established), but the control valve 53 begins to increase the flow of coolant to the condenser more rapidly to dissipate heat.

It is apparent that this control system provides automatic regulation of the coolant supplied to both the pump 49 and the condenser 46 under the control of the temperature-responsive control valve 53 in order to maintain heat balance conditions throughout the full range of feed water temperature encountered, and at the same time provides means for eliminating air and non-condensible gases from the system.

The solenoid-actuated valve 52 interposed in the conduit 12a remains open while the motor which drives the pump 10 is in operation. In smaller apparatus, it is feasible to drive the pumps 10, 35 and 42 from the same motor.

The distillation unit, as thus far described, is suitable for carrying out the process which is about to be described for eliminating scaling on the surfaces of the heat exchange tubes 24 with which the sea water comes into contact. It should be understood that the process herein described and claimed is not necessarily employed in conjunction with this particular distillation unit.

The term "scaling" or "precipitation," as used herein, refers to the deposits which tend to form and build up on the heat exchange surfaces of sea water vaporizing apparatus. Although the exact composition of the scale will vary somewhat from location to location, the scale is for the most part magnesium hydroxide with lesser amounts of calcium carbonate and calcium sulphate.

In sea water distillation apparatus, the formation of scale causes gradual reduction in the efficiency and rate of output of distillate. In thermocompression apparatus, the most efficient apparatus for distilling sea water, scale formation not only decreases the output of the unit, but increases the horsepower necessary to drive the vapor compressor, that is, the compressor 27 in the apparatus shown in FIGURE 1. The inefficiency caused by scaling greatly increases the cost of manufacturing distillate; therefore, it is customary to shut down the units every three or four weeks to remove the scale. Even if efficiency is not the most important factor in a particular installation, frequent removal of scale is dictated because thick scale is more difficult to remove than thin scale, and besides, there is danger that thick particles of scale will flake off during operation and foul up, damage or cause undue wear to the blowdown pump. Conventional methods of removing scale include acid and chemical treatment, ultrasonic vibrations, etc. They are time-consuming, costly and, most serious of all, require shutdown and restarting of the apparatus.

It is well known that there are many factors which will influence the tendency and rate of scaling of a heat exchange surface by sea water during the vaporization thereof. These factors include the retention time of the sea water within the vaporization chamber, the quantity of foreign matter in the sea water, the roughness of the heat exchange surface, the type of metal with which the sea water comes into contact within the distillation unit, and the carbon dioxide equilibrium of the sea water. These factors however, are important only if scaling conditions are permitted to exist in the vaporization chamber. That is to say, they will influence the tendency and rate of scaling in some degree once scale begins to form, but are of no significance whatever if scaling is prevented by proper control of the more critical factors of the process of the present invention.

The present invention results from a discovery that scaling of the surfaces of a vaporization chamber of a sea water evaporation or distillation apparatus can be eliminated by proper control of certain operational conditions.

One of the primary factors influencing the build-up of scale is the temperature of the heat exchange surface, that is, the surface of the heat exchange tube 24 (see FIGURE 2) adjacent the film or layer of sea water which is in contact therewith. Although high efficiency would seem to dictate that vapor be evolved from the sea water at a fairly high temperature, it has been discovered that heat exchange surfaces tend to scale more rapidly from a condition entirely free of scale when the temperature of the heat exchange surfaces exceeds about 120° F. (other operating conditions being suitably controlled in accordance with this invention). On the other hand, it is not feasible to maintain the temperature of the heat exchange surfaces less than about 95° F. during operation. For all practical purposes, an optimum temperature range for the heat exchange surfaces of the tubes 24 is between 105° F. and 115° F. Obviously, in order to maintain this temperature range, it is essential to maintain the temperature of the compressed vapor within the vapor chest 31 within this range.

The impurity of the sea water (i.e., total solids dissolved therein) which is to be distilled, has a bearing on the maximum temperature which can be maintained while still affording the improved and unexpected results of the present invention. For example, if sea water having an exceptionally low impurity content is being distilled, it may be possible to increase the temperature of the compressed vapor within the vapor chest 31 up to about 120° F. without causing appreciable scaling of the heat exchange and other surfaces of the distillation unit.

Figure 3:
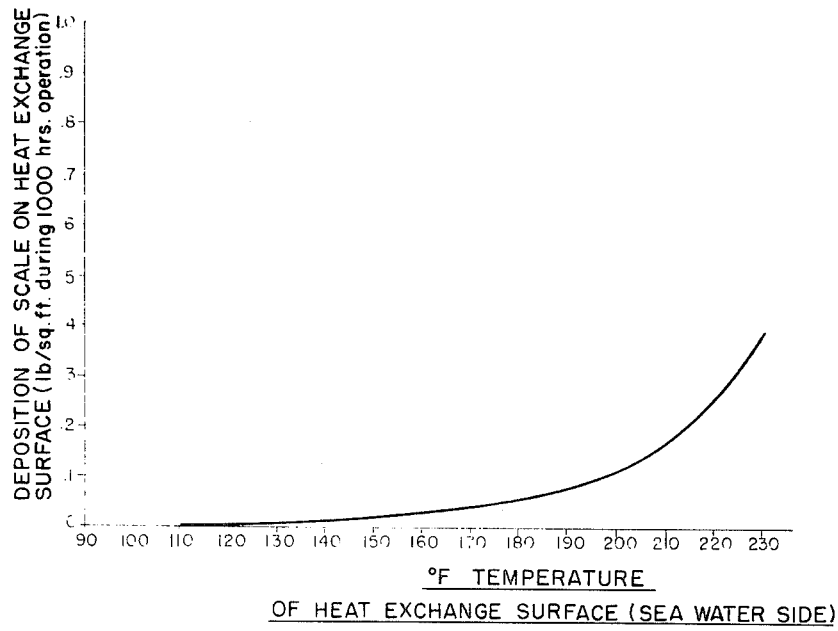
FIGURE 3 is a curve which shows the relationship between the weight of deposition of scale on the surface with which the sea water comes into contact and the temperature of the heat exchange surface at a specified concentration of the sea water.

The curve shown in FIGURE 3 represents the relationship between scaling and temperature of the heat exchange surface for sea water from the coastal regions of the Gulf of Mexico, or in other words, sea water of relatively high impurity content ("normal sea water"). It is based on data obtained utilizing various atmospheric thermocompression type distillation apparatus operated under conditions which include (a) a mean temperature differential of from 6° to 9° F. between the temperature of the water in the heat exchange tubes 24 and the temperature of the compressed steam, and (b) an average ratio of approximately 1.5 between the rate of feed of sea water to the unit and the rate at which concentrated sea water is removed. The purpose of FIGURE 3 is not to provide operating data for a specific apparatus, but to establish the general proposition that there is in fact a temperature of the heating surface at which scale-free operation is possible at relatively low concentrations.

In order to make possible the vaporization of the sea water at low temperatures of this order, it is essential that a high vacuum (low absolute pressure) be maintained within the vapor region of the vaporization chamber. Since vaporization of the sea water is usually carried on with a mean temperature differential of between 5° F. and 12° F. between the temperature of the heat exchange surfaces and the temperature of the sea water to be vaporized, this temperature differential should be considered in establishing the pressure of the vapor region of the vaporization chamber.

The tendency to scale and the rate of scaling of the heat exchange surfaces is appreciably influenced by the concentration of sea water within the liquid region of the vaporization chamber. More specifically, a relatively high rate of discharge of concentrated sea water is required in order to operate under scale-free conditions. The concentration of the sea water within the liquid region of the vaporization chamber can be conveniently expressed in terms of the "concentration ratio," that is to say, the ratio between the rate of feed of sea water to the liquid region of the vaporization chamber and the rate of removal of concentrated sea water therefrom. By way of illustration, if the rate of feed of the sea water to the liquid region of the vaporization chamber is one gallon per minute, the rate of manufacture of distillate is .25 gallon per minute, and the rate of removal of concentrated sea water therefrom is .75 gallon per minute, the concentration ratio is 1.33 (1 gal. per min./.75 gal. per min.).

Figure 4:
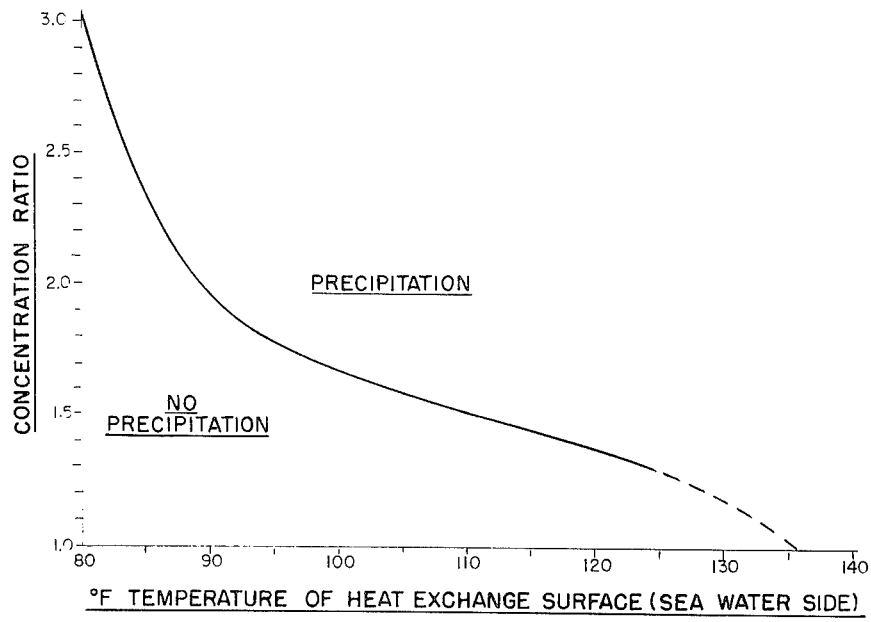
FIGURE 4 is a curve which shows the point at which scaling begins to form at different concentration ratios and at different temperatures of the evaporating film of sea water at zero velocity of the sea water.

FIGURE 4 is a curve showing the concentration ratio plotted against temperature of the heating surface with one side of the curve representing the conditions under which precipitation or scaling will form and the other side representing the conditions under which no precipitation or scaling will form. The curve of FIGURE 4 is based on experiments carried out with sea water from the coastal region of Pensacola, Florida. This curve shows that scaling can be avoided at a relatively low operating temperature of the heat exchange surface of about 95° F. with a concentration ratio up to about 1.7, and at a relatively high temperature of 120° F. (i.e., relatively high for purposes of this process) with a concentration ratio up to about 1.3. As for the low limit of concentration ratio, it is impractical and inefficient to operate at a concentration ratio of less than 1.2, since to do so requires too large and costly a feed heater, and a greater expenditure of energy in pumping the concentrated sea water through the discharge conduit 40 in relation to the amount of distillate manufactured. For all practical purposes, therefore, a concentration ratio in the range of from 1.2 to 1.5 is necessary for scale-free operation, and a concentration ratio of between 1.3 and 1.4 is regarded as optimum.

Although the temperature of the heat exchange surfaces and the concentration ratio of the sea water in the liquid region of the vaporization chamber are related primary factors which must be controlled to eliminate the formation of scale on the heat exchange surfaces, nevertheless, another important factor is the forced circulation of the sea water by the rotary circulator 19 to prevent localized concentration. The function of the rotary circulator is to impart velocity and resulting turbulent flow to the sea water within the tubes 24 and also to build up pressure within the tubes 24 to prevent the vaporization of the sea water in the major part of the tube. Turbulent flow causes rapid continuous mixing, and near the tube exits some minor flashing and vaporization takes place; the turbulent flow prevents localized concentration near the tube exits. The pressure substantially prevents the liquid from vaporizing until it is discharged from the upper ends of the heat exchange tubes 24, whereupon some of the sea water "flashes" into vapor (less than 1% of the amount circulated). Although vaporization of the liquid within the tubes 24 is to be avoided, it is not too serious if some small steam bubbles are formed near the upper ends of the heat exchange tubes due to the drop of pressure, since the velocity of the water will sweep them away and prevent localized concentration.

Other advantages of imparting a relatively high velocity to the sea water within the heat exchange tubes 24 are that the liquid has a tendency to scour away scum and other foreign matter from the heat exchange surfaces, and the heat transfer rate is materially improved. Nevertheless, these are only an incidental advantage of the rotary circulator and not the paramount purpose thereof.

Although the velocity of the liquid is meaningful only in relation to a particular apparatus, in the apparatus described above in connection with FIGURE 1, the desired objects can be achieved by imparting a velocity of between 5 and 6 feet per second to the sea water through the tubes 24. In most apparatus, a velocity in the range of from 2 to 10 feet per second will make possible the elimination of localized concentration within the heat exchange passages.

By way of illustrating the process of the present invention, a specific example will be described with reference to the apparatus of FIGURE 1, bearing in mind, however, that the process is not limited to the use of this particular apparatus. The liquid region of the apparatus accommodates 14 gallons, and the unit manufactures 500 gallons of distillate per day. A vacuum of approximately 27.61 in. Hg (absolute pressure 2.31 in. Hg) is maintained in the vaporization chamber. The feed water is strained, preheated and introduced at 1.46 gallons per minute into the vaporization chamber at a temperature of approximately 104° F. The circulator circulates the sea water through bronze heat exchange tubes 24 at a velocity of approximately 6 feet per second. The compressed vapor is introduced through the duct 30 into the vapor chest 31 at a temperature of approximately 112° F. The tubes 24 of the heat exchanger through which the feed water is circulated are .25 in. in diameter and are 32 in. in length. There are a total of 434 such tubes. The mean temperature of the circulating sea feed water within the liquid region of the vaporization chamber is 108° F. The concentrated solution is withdrawn from the vaporization chamber at a rate of 1.10 gallons per minute, establishing a concentration ratio of 1.33.

When normal sea water is distilled according to the process outlined above, the rate of crystallization and formation of scale on the heat exchange surfaces is completely eliminated. Any scale that might form in distilling waters which have a high tendency to crystallize, precipitate and scale would be at a rate less than $\frac{1}{10}$ to $\frac{1}{15}$ the rate of crystallization in forming of scale under the best controlled conditions heretofore known. Thus, whereas most conventional apparatus requires treatment to eliminate scale and other debris every two weeks, the process of the present invention will probably not require cleaning when used with normal sea water feed, or more than once every six months with unusually concentrated sea water.

In order to prevent any misunderstanding, it should be pointed out that the composition of sea water varies throughout the world and, therefore, the optimum control conditions for scale-free operation will vary somewhat from location to location. To make matters worse, except for shipboard and drilling rig evaporators, most sea water distillation apparatus are operated in the coastal regions, or that is to say, waters in which there is the most variation. Nevertheless, although the optimum operating conditions will vary somewhat, it is believed that they will fall within the outside ranges specified herein.

The question may arise as to why this process for eliminating scale in distillation apparatus has not heretofore been recognized by persons skilled in the art. One possible explanation is that prior to this invention there were many misconceptions regarding the factors which are of primary importance in the elimination of scale in the distillation of sea water. One important and highly publicized study resulted in the erroneous conclusion that scale formation was actually greater at low temperatures, and as of the time of this invention this was a view held by many persons skilled in the art. This erroneous conclusion was apparently based on a study which placed undue emphasis on scale thickness rather than the actual quantity of scale build-up in terms of weight per unit area.

Sea water has been known to have a reverse solubility curve, that is to say, the chemicals dissolved in the water are less soluble at higher temperatures and precipitate out at some specific temperature. It was discovered by the inventor that it is not the average temperature of the mass of sea water flowing through the heat exchange tubes (that is, the temperature which normally would be observed by reading a thermometer placed therein) which is important in causing precipitation, but instead, the temperature of the film of sea water immediately adjacent the heat exchange surface, or, stated another way, the heat exchange surface itself. Other important steps were the appreciation of the criticality of the concentration ratio, and the importance of preventing localized concentration. The present process, therefore, remained unavailable to the art until this invention.

The invention has been shown in preferred form and by way of example only, and obviously many variations and modifications may be made therein without departing from the spirit of the invention. The invention, therefore, is not limited to any specified form or embodiment except insofar as such limitations are set forth in the appended claims.

I claim:

1. A process for evolving vapor from sea water within a vaporization chamber to prevent formation of scale on the heat exchange surfaces thereof comprising the steps of feeding sea water to the lower liquid region of the vaporization chamber, the liquid region of the vaporization chamber containing a liquid downtake passage and a plurality of heat exchange surfaces defining flow passages, regulating the temperature of the heat exchange surfaces to be within the range of from 95° F. to 120° F., maintaining a pressure within the vapor region of the vaporization chamber sufficiently low to evolve vapor from the liquid within the liquid region, circulating the sea water from the liquid downtake passage through the flow passages and back to the downtake passage at a velocity and pressure sufficient to prevent vapor from being evolved in the flow passages, and removing concentrated sea water from the liquid region of the vaporization chamber so as to maintain a concentration ratio within the range of from 1.2 to 1.5 but not exceeding the concentration ratio represented by the curve of FIGURE 4 for the temperature at which the heat exchange surfaces are maintained.

2. A process as set forth in claim 1 in which the temperature of the heat exchange surfaces is regulated to be within the range of from 105° F. to 115° F.

3. A process for distilling sea water which eliminates the formation of scale on the heat exchange surfaces which define liquid flow passages in the lower liquid region of a vaporization chamber comprising the steps of introducing sea water into the liquid region of the vaporization chamber, regulating the temperature of the heat exchange surfaces to a value not to exceed 120° F., maintaining a pressure within the vapor region of the vaporization chamber low enough to evolve vapor from the liquid in the liquid region thereof, removing sea water from the liquid region so as to maintain a concentration ratio of less than 1.7 and not exceeding the value represented by the curve of FIGURE 4 for the temperature at which the heat exchange surfaces are maintained, and circulating the sea water within the liquid region through the flow passages at a velocity and pressure sufficient to prevent vapor from being evolved in the flow passages.

4. A process for distilling sea water as set forth in claim 3 in which the temperature of the heat exchange surfaces is regulated so as not to fall below 95° F.

5. A process for distilling sea water as set forth in claim 3 in which the concentration ratio is maintained no lower than 1.2.

6. A process for distilling sea water which eliminates the formation of scale on the heat exchange surfaces comprising the steps of introducing sea water into a vaporization chamber which includes a lower liquid region and an upper vapor region, regulating the temperature of the heat exchange surfaces to be within a range of from 95° F. to 120° F., maintaining a pressure within the upper vapor region of the vaporization chamber low enough to evolve vapor from the sea water within the liquid region, circulating the liquid within the liquid region of the vaporization chamber at a velocity and pressure sufficient to prevent vapor from being evolved in the flow passages, and maintaining a concentration ratio within the range of from 1.2 to 1.5 within the liquid region of the vaporization chamber but not exceeding the concentration ratio represented by the curve of FIGURE 4 for the temperature at which the heat exchange surfaces are maintained.

7. A process as set forth in claim 6 in which the temperature of the heat exchange surfaces is regulated to be within the range of from 105° F. to 115° F.

8. A process for evaporating sea water which eliminates the formation of scale on the heat exchange surfaces of the vaporization apparatus comprising the steps of feeding the sea water to be evaporated to the lower liquid region of a vaporization chamber, the lower liquid region of the vaporization chamber containing means defining a liquid downtake passage and a plurality of heat exchange surfaces defining flow passages, regulating the temperature of the heat exchange surfaces to be within the range of from 105° F. to 115° F., regulating the pressure within the upper vapor region of the vaporization chamber to a value which permits vapor to be evolved from the sea water within the liquid region, circulating the liquid from the downtake passage through the flow passages and back to the downtake passage at a velocity and pressure sufficient to prevent vapor from being evolved in the flow passages, removing the vapor evolved within the upper vapor region of the vaporization chamber, and removing sea water from the liquid region of the vaporization chamber at a rate sufficient to maintain a concentration ratio of less than 1.5 within the liquid region of the vaporization chamber and not exceeding the concentration ratio represented by the curve of FIGURE 4 for the temperature at which the heat exchange surfaces are maintained.

9. A process for distilling sea water by thermocompression which eliminates the formation of scale on the heat exchange surfaces of the thermocompression distillation apparatus comprising the steps of feeding the sea water to be distilled to the lower liquid region of the vaporization chamber, the lower liquid region of the vaporization chamber containing means defining a liquid downtake passage and a plurality of heat exchange surfaces defining flow passages, compressing the vapor evolved in the upper vapor region of the vaporization chamber, condensing the compressed vapor in heat-exchange relationship with the heat exchange surfaces, whereby the latent heat of compression is transferred to the sea water to be vaporized within the lower liquid region of the vaporization chamber, regulating the temperature of the heat exchange surfaces to be within the range of from 105° F. to 115° F., collecting the condensed vapor, regulating the pressure within the upper vapor region of the vaporization chamber to a value which permits vapor to be evolved from the sea water within the liquid region, circulating the liquid from the downtake passage through the flow passages and back to the downtake passage at a velocity and pressure sufficient to prevent vapor from being evolved in the flow passages, and removing sea water from the liquid region of the vaporization chamber at a rate sufficient to maintain a concentration ratio in the range of from 1.2 to 1.5 within the liquid region of the vaporization chamber but not exceeding the concentration ratio represented by the curve of FIGURE 4 for the temperature at which the heat exchange surfaces are maintained.

10. A process for evolving vapor from sea water within a vaporization chamber to prevent formation of scale on the heat exchange surfaces thereof, said liquid region of the vaporization chamber containing a downtake passage, a plurality of heat exchange surfaces, and a circulator for maintaining flow of the liquid from the downtake passage past the heat exchange surfaces back to the downtake passage, said process comprising the steps of feeding sea water to the vaporization chamber, preheating the sea water to a temperature not to exceed 120° F., circulating the sea water from the downtake passage past the heat exchange surfaces and back to the downtake passage at a velocity and pressure sufficient to prevent vapor from being evolved on the heat exchange surfaces, removing vapor from the vapor region of the vaporization chamber, compressing the vapor and then condensing the compressed vapor in heat-exchange relation with the heat exchange surfaces, the exchange of heat being regulated so as not to increase the temperature of the heat exchange surfaces above 120° F., and removing sea water from the vaporization chamber at a rate so as to maintain a concentration ratio within the vaporization chamber which does not exceed 1.5 and also not exceeding the concentration ratio represented by the curve of FIGURE 4 for the temperature at which the heat exchange surfaces are maintained.

11. A process for evolving vapor from sea water within a vaporization chamber to prevent formation of scale on the surfaces of the heat exchange passages and to minimize corrosion thereof in which the vaporization chamber includes an upper vapor region and a lower liquid region, the lower liquid region containing a downtake passage, a plurality of heat exchange passages surrounding the downtake passage, and an axial-intake centrifugal-discharge circulator below the downtake passage which deflects the liquid downwardly and outwardly, said process comprising the steps of introducing sea water to the vaporization chamber at a temperature not to exceed 120° F., circulating the sea water by means of said circulator downwardly through the downtake passage and then downwardly and outwardly through the circulator and then upwardly through the heat exchange passage surfaces and finally back to the downtake passage at a velocity and pressure sufficient to prevent vapor from being evolved in the heat exchange passages, said circulation being confined to the liquid region of the vaporization chamber, maintaining a low vacuum pressure within the vapor region of the vaporization chamber to flash part of the sea water into vapor as it emerges from the upper ends of the heat exchange passages, heating the heat exchange surfaces to a temperature in the range of from 95° F. to 120° F., and removing sea water from the vaporization chamber at a rate to maintain a concentration ratio within the liquid region substantially below 1.7 and not exceeding the concentration ratio represented by the curve of FIGURE 4 for the temperature at which the heat exchange surfaces are maintained.

12. A process for evolving vapor from sea water within a vaporization chamber to prevent formation of scale on the surfaces of the heat exchange passages and to minimize corrosion thereof in which the vaporization chamber includes an upper vapor region and a lower liquid region, and the liquid region contains a funnel-shaped downtake passage, a plurality of heat exchange passages surrounding the downtake passage and an axial-intake, a centrifugal-discharge circulator below the downtake passage which deflects the liquid downwardly and outwardly, said process comprising the steps of introducing sea water to the vaporization chamber at a temperature not to exceed 120° F., accelerating the sea water by means of said circulator downwardly through the funnel-shaped downtake passage and then circulating it downwardly and outwardly through the circulator and then upwardly through the heat exchange passages and finally back to the downtake passage at a velocity and pressure sufficient to prevent vapor from being evolved in the heat exchange passages, maintaining a low vacuum pressure within the vapor region of the vaporization chamber to flash part of the sea water into vapor as it emerges from the upper ends of the heat exchange passages, removing vapor from the vapor region of the vaporization chamber, compressing the vapor and then condensing the compressed vapor in heat-exchange relation with the liquid in the heat exchange passages, withdrawing condensate and gases from the vaporization chamber, said compression and withdrawal of condensate and gases being regulated to maintain the temperature of the heat exchange surfaces in the range of from 95° F. to 120° F., and removing sea water from the vaporization chamber at a rate so as to maintain a concentration ratio within the liquid region in the range of from 1.2 to less than 1.7 but not exceeding the concentration ratio represented by the curve of FIGURE

13

4 for the temperature at which the heat exchange surfaces are maintained.

13. A process as set forth in claim 12 including the step of isolating the liquid passing through the downtake passage from the compressed vapor.

References Cited by the Examiner

UNITED STATES PATENTS 2,619,453  11/1952  Andersen _____ 202—75
2,863,501  12/1958  Farnsworth _____ 202—75 X

14

OTHER REFERENCES

Ellis, C. B.: "Fresh Water from the Ocean," N.Y., Ronald Press Co., 1954, pp. 151–156.

"Saline Water Conversion," U.S. Dept. of Interior, Washington, D.C., January 1956, pp. 12, 13.

"Symposium on Saline Water Conversion," pp. 44–50, National Academy of Sciences—National Research Council, Washington, D.C., 1958, publication 568.

NORMAN YUDKOFF, *Primary Examiner.*

M. H. SILVERSTEIN, *Assistant Examiner.*